US012691450B2

(12) United States Patent
Deng et al.

(10) Patent No.: US 12,691,450 B2
(45) Date of Patent: Jul. 28, 2026

(54) MICROFLUIDIC SUBSTRATE, MICROFLUIDIC CHIP AND MANUFACTURING METHOD THEREOF

(71) Applicant: BOE TECHNOLOGY GROUP CO., LTD., Beijing (CN)

(72) Inventors: Ruijun Deng, Beijing (CN); Zhukai Liu, Beijing (CN); Ding Ding, Beijing (CN); Haonan Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1198 days.

(21) Appl. No.: 17/753,101

(22) PCT Filed: Mar. 12, 2021

(86) PCT No.: PCT/CN2021/080452

§ 371 (c)(1),
(2) Date: Feb. 18, 2022

(87) PCT Pub. No.: WO2022/188149

PCT Pub. Date: Sep. 15, 2022

(65) Prior Publication Data

US 2023/0158508 A1 May 25, 2023

(51) Int. Cl.
*B01L 3/00* (2006.01)
*B01L 7/00* (2006.01)
*B01L 99/00* (2010.01)

(52) U.S. Cl.
CPC ........... *B01L 7/52* (2013.01); *B01L 3/502707* (2013.01); *B01L 2300/12* (2013.01); *B01L 2300/1827* (2013.01)

(58) Field of Classification Search
CPC ......... B01L 2200/12; B01L 2300/0645; B01L 2300/0809; B01L 2300/0887;
(Continued)

(56) References Cited

U.S. PATENT DOCUMENTS

2004/0178006 A1 9/2004 Cok
2012/0227780 A1 9/2012 Kurihara et al.
(Continued)

FOREIGN PATENT DOCUMENTS

CN 1530818 A 9/2004
CN 102168011 A 8/2011
(Continued)

OTHER PUBLICATIONS

Office Action received for Chinese Patent Application No. 202180000463.6, mailed on May 31, 2023, 11 pages (4 pages of English Translation and 7 pages of Original Document).
(Continued)

*Primary Examiner* — Lydia Edwards
(74) *Attorney, Agent, or Firm* — Calfee, Halter & Griswold LLP

(57) ABSTRACT

The present disclosure provides a microfluidic substrate, a microfluidic chip and a manufacturing method thereof. The microfluidic substrate includes: a first substrate; a conductive layer on the first substrate; and a defining layer on a side of the conductive layer facing away from the first substrate, the defining layer defining a concave portion; wherein the conductive layer comprises a plurality of conductive patterns corresponding to the concave portion, the plurality of conductive patterns are arranged along a first direction, each conductive pattern extends along a second direction and comprises a first end and a second end, the first direction is perpendicular to the second direction, and each conductive pattern has a maximum local resistance value at the first end and the second end of the conductive pattern.

19 Claims, 6 Drawing Sheets

(58) Field of Classification Search
CPC ............ B01L 2300/12; B01L 2300/16; B01L 2300/161; B01L 2300/165; B01L 2300/18; B01L 2300/1827; B01L 3/502707; B01L 3/502761; B01L 3/50851; B01L 7/00; B01L 7/52; H10N 19/00
See application file for complete search history.

(56) References Cited

U.S. PATENT DOCUMENTS

| | | | |
|---|---|---|---|
| 2013/0193549 | A1 | 8/2013 | Lee |
| 2013/0257774 | A1 | 10/2013 | Kim et al. |
| 2014/0290980 | A1 | 10/2014 | Tang et al. |
| 2015/0380467 | A1 | 12/2015 | Su |
| 2016/0211316 | A1 | 7/2016 | Oh et al. |
| 2018/0321094 | A1 | 11/2018 | Jang et al. |
| 2021/0346891 | A1 | 11/2021 | Geng et al. |
| 2022/0193669 | A1 | 6/2022 | Gao et al. |

FOREIGN PATENT DOCUMENTS

| | | | |
|---|---|---|---|
| CN | 102566165 | A | 7/2012 |
| CN | 103207702 | A | 7/2013 |
| CN | 104020888 | A | 9/2014 |
| CN | 104252276 | A | 12/2014 |
| CN | 105810711 | A | 7/2016 |
| CN | 106098710 | A | 11/2016 |
| CN | 107481922 | A | 12/2017 |
| CN | 109420532 | A | 3/2019 |
| CN | 111194102 | A | 5/2020 |
| CN | 111266139 | A | 6/2020 |
| CN | 111468198 | A | 7/2020 |
| EP | 2419552 | A1 | 2/2012 |
| WO | 2005/118773 | A2 | 12/2005 |
| WO | 2010/119430 | A1 | 10/2010 |

OTHER PUBLICATIONS

Supplementary European Search Report and Search Opinion received for European Application No. 21929624.1, mailed on Apr. 13, 2023, 8 pages.

Novelty search report for “Microfluidic Substrate, Microfluidic Chip and Manufacturing Method Thereof,” dated on Nov. 17, 2020, 7 pages.

Chang et al., “Integrated polymerase chain reaction chips utilizing digital microfluidics”, Biomed Microdevices, vol. 8, May 20, 2006, pp. 215-225.

Fu et al., “A microfluidic chip based on surfactant-doped polydimethylsiloxane (PDMS) in a sandwich configuration for low-cost and robust digital PCR”, Sensors and Actuators B: Chemical, vol. 245, Jan. 2017, pp. 414-422.

Hui, Cheng, “Research on Temperature Control System of PCR Microfluidic Chips”, Dissertation Submitted to Hebei University of Technology for The Master Degree of Microelectronics and Solid State Electronics, Mar. 2011, 54 pages (English Abstract Submitted).

International Search Report received for PCT Patent Application No. PCT/CN2021/080452, mailed on Nov. 26, 2021, 5 pages of Original Document Only.

Sun et al., “A heater-integrated transparent microchannel chip for continuous-flow PCR”, Sensors and Actuators B, vol. 84, May 2002, pp. 283-289.

MICROFLUIDIC SUBSTRATE, MICROFLUIDIC CHIP AND MANUFACTURING METHOD THEREOF

RELATED APPLICATIONS

The present application is a 35 U.S.C. 371 national stage application of PCT International Application No. PCT/CN2021/080452, filed on Mar. 12, 2021.

TECHNICAL FIELD

The present disclosure relates to the field of biological detection, in particular to a microfluidic substrate, a microfluidic chip and a manufacturing method thereof.

BACKGROUND

Digital polymerase chain reaction chip technology (dPCR) is a quantitative analysis method that provides digitalized DNA quantitative information. Since its proposal, it has shown significant advantages in many fields. However, the initial dPCR technology develops very slowly, because if the traditional 96-well plate or 384-well plate is used for PCR amplification, several multi-well plates need to perform amplification simultaneously, which not only involves complicated operations, but also consumes a large amount of experimental samples and reagents. With the emergence of the microfluidic technology and its rapid development in recent years, the combination of microfluidic technology and dPCR technology has greatly improved the sensitivity and accuracy. So far, many companies have successively launched dPCR products. These products have shown huge technological advantages and commercial prospects in research fields such as single cell analysis, early cancer diagnosis, prenatal diagnosis, and the like.

SUMMARY

The present disclosure provides a microfluidic substrate, a microfluidic chip and a manufacturing method thereof. The patterned design of the conductive layer improves the uniformity of heating and reduces the low-temperature edge area of the conductive layer. As a result, the actual size of the microfluidic chip can be effectively reduced, and the number of reaction chambers per unit area can be increased.

According to an aspect of the present disclosure, there is provided a microfluidic substrate. The microfluidic substrate comprises: a first substrate; a conductive layer on the first substrate; and a defining layer on a side of the conductive layer facing away from the first substrate, the defining layer defining a concave portion; wherein the conductive layer comprises a plurality of conductive patterns corresponding to the concave portion, the plurality of conductive patterns are arranged along a first direction, each conductive pattern extends along a second direction and comprises a first end and a second end, the first direction is perpendicular to the second direction, and each conductive pattern has a maximum local resistance value at the first end and the second end of the conductive pattern.

Optionally, in some embodiments, the conductive layer has a uniform thickness, each conductive pattern has a midpoint in the second direction, and each conductive pattern has a maximum width along the first direction at the midpoint.

Optionally, in some embodiments, each conductive pattern has a minimum width along the first direction at the first end and the second end of the conductive pattern.

Optionally, in some embodiments, each conductive pattern has a width that changes continuously along the second direction.

Optionally, in some embodiments, each conductive pattern has linear sides.

Optionally, in some embodiments, each conductive pattern has curvilinear sides.

Optionally, in some embodiments, each conductive pattern has a width that changes discontinuously along the second direction.

Optionally, in some embodiments, each conductive pattern has an axisymmetric shape, and a symmetry axis of the axisymmetric shape is parallel to the second direction.

Optionally, in some embodiments, each conductive pattern has a minimum thickness at the first end and the second end of the conductive pattern.

Optionally, in some embodiments, an overall resistance value between the first end and the second end of each conductive pattern decreases as a distance between the conductive pattern and a center of the concave portion increases.

Optionally, in some embodiments, the conductive layer has a uniform thickness, and a width of each conductive pattern in the first direction increases as a distance between the conductive pattern and a center of the concave portion increases.

Optionally, in some embodiments, the plurality of conductive patterns has a same length in the second direction.

Optionally, in some embodiments, the plurality of conductive patterns constitute a parallel circuit, and a current path of each conductive pattern is along the second direction.

Optionally, in some embodiments, the first substrate is a glass substrate.

Optionally, in some embodiments, a material of the conductive layer comprises at least one of indium tin oxide and indium zinc oxide.

Optionally, in some embodiments, a surface of the concave portion is hydrophilic.

Optionally, in some embodiments, the microfluidic substrate further comprises: a wiring between the conductive layer and the first substrate, and a passivation layer between the wiring and the conductive layer, the passivation layer comprising a through hole; the conductive layer is electrically connected to the wiring via the through hole.

Optionally, in some embodiments, the wiring comprises a Mo—AlNd—Mo alloy layer.

According to another aspect of the present disclosure, there is provided a microfluidic chip. The microfluidic chip comprises: the microfluidic substrate described in any of the foregoing embodiments; a counter substrate on a side of the defining layer facing away from the first substrate; and a sealant on the periphery of the concave portion, the sealant defining a chamber.

Optionally, in some embodiments, the chamber is a reaction chamber, and the counter substrate comprises a sample inlet and a sample outlet.

According to a further aspect of the present disclosure, there is provided a method for manufacturing a microfluidic chip. The method comprises: providing a first substrate; forming a conductive layer on the first substrate and patterning the conductive layer; forming a defining layer on a side of the conductive layer facing away from the first substrate, the defining layer defining a concave portion, the conductive layer comprising a plurality of conductive patterns corresponding to the concave portion, the plurality of conductive patterns being arranged along a first direction, each conductive pattern extending along a second direction and comprising a first end and a second end, the first direction being perpendicular to the second direction, and each conductive pattern having a maximum local resistance value at the first end and the second end of the conductive pattern; arranging a sealant on the periphery of the concave portion, the sealant defining a chamber; and arranging a counter substrate on a side of the defining layer facing away from the first substrate.

BRIEF DESCRIPTION OF THE DRAWINGS

In order to illustrate embodiments of the present disclosure or the technical solutions in the prior art more clearly, the drawings that need to be used in the description of the embodiments or the prior art will be briefly introduced below. Obviously, the drawings in the description below are only some embodiments of the present disclosure. For those of ordinary skill in the art, other drawings may be further obtained based on these drawings without creative work.

DETAILED DESCRIPTION OF THE DISCLOSURE

The technical solutions in embodiments of the present disclosure will be described clearly and comprehensively below in conjunction with the drawings in the embodiments of the present disclosure. Obviously, the described embodiments are only part of the embodiments of the present disclosure, rather than all of them. All other embodiments obtained by those of ordinary skill in the art without creative work fall within the protection scope of the present disclosure.

Figure 1:
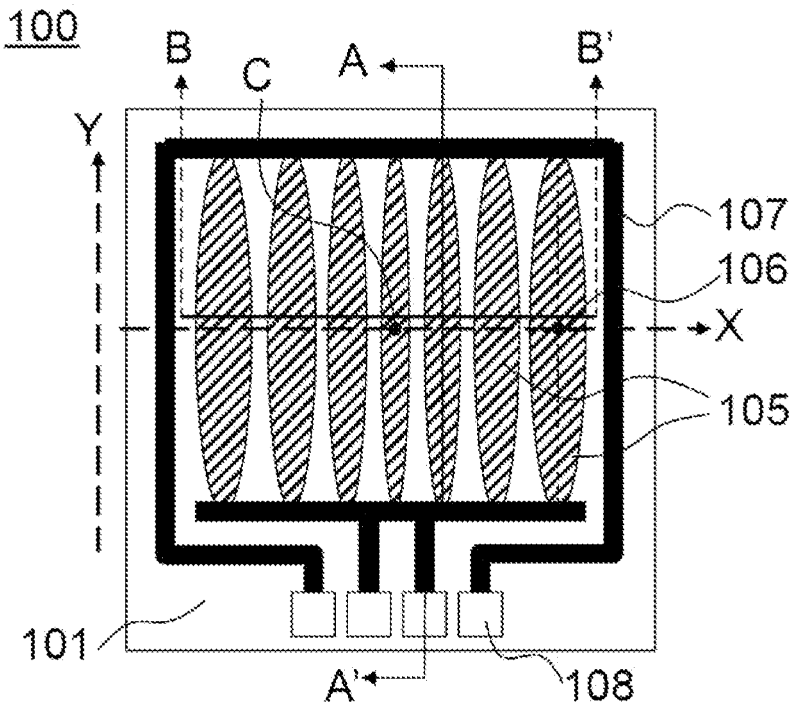
FIG. 1 illustrates a top view of a microfluidic substrate according to an embodiment of the present disclosure.
Figure 2A:
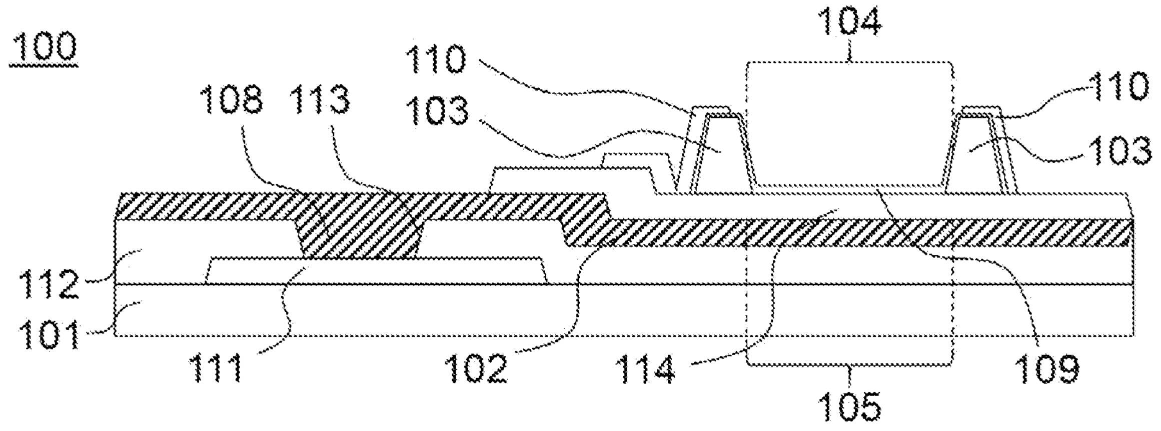
FIG. 2A illustrates a cross-sectional view of the microfluidic substrate shown in FIG. 1 taken along line A-A' according to an embodiment of the present disclosure.
Figure 2B:
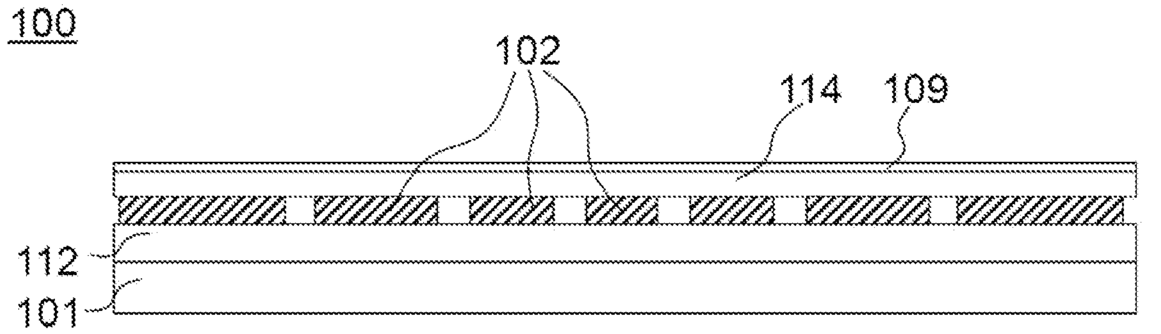
FIG. 2B illustrates a cross-sectional view of the microfluidic substrate shown in FIG. 1 taken along line B-B' according to an embodiment of the present disclosure.

According to an aspect of the present disclosure, a microfluidic substrate is provided. FIG. 1 illustrates a top view of a microfluidic substrate according to an embodiment of the present disclosure. FIG. 2A illustrates a cross-sectional view of the microfluidic substrate shown in FIG. 1 taken along line A-A'. FIG. 2B illustrates a cross-sectional view of the microfluidic substrate shown in FIG. 1 taken along line B-B'. The shape, size, and thickness of each film layer in the drawings do not reflect the true scale of each film layer, and are only intended to illustrate the present disclosure. As shown in FIGS. 1-4, a microfluidic substrate 100 comprises: a first substrate 101; a conductive layer 102 on the first substrate 101; and a defining layer 103 on a side of the conductive layer 102 facing away from the first substrate 101, the defining layer 103 defining a concave portion 104; wherein the conductive layer 102 comprises a plurality of conductive patterns 105 corresponding to the concave portion 104, the plurality of conductive patterns 105 are arranged along a first direction X, each conductive pattern 105 extends along a second direction Y and includes a first end 1051 and a second end 1052, the first direction X is perpendicular to the second direction Y; each conductive pattern 105 has the maximum local resistance value at the first end and the second end of the conductive pattern 105.

In the context of the present disclosure, the "local resistance value" refers to a resistance value per unit length of each conductive pattern in the length direction (i.e., second direction).

In the embodiments of the present disclosure, for a single conductive pattern, the first end and the second end of the conductive pattern have a local resistance value greater than that of the middle position of the conductive pattern. According to the resistance heating formula $P=I^2R$, the heating power at the first end and the second end of the conductive pattern will also be greater than the heating power at the middle position of the conductive pattern. According to the microfluidic substrate provided by the embodiment of the present disclosure, by designing the resistance of the conductive layer, the uniformity of heating is improved, and the low-temperature edge area of the conductive layer is reduced. As a result, the actual size of the microfluidic chip can be effectively reduced, and the number of reaction chambers per unit area can be increased.

Optionally, in some embodiments, as shown in FIGS. 1, 2A, 2B, 3 and 4, the conductive layer 102 has a uniform thickness, each conductive pattern 105 has a midpoint 106 in the second direction Y, and each conductive pattern 105 has a maximum width along the first direction X at the midpoint 106.

For example, each conductive pattern 105 may have a centrally symmetrical shape having a maximum width along the first direction X at the center of symmetry (i.e., the midpoint 106 in the second direction Y).

A distance between two adjacent conductive patterns 105 may be in a range of 1 to 200 μm. A simulation result shows that after patterning the conductive patterns in two directions, the temperature uniformity in the region of the concave portion has been significantly improved.

Figure 3:
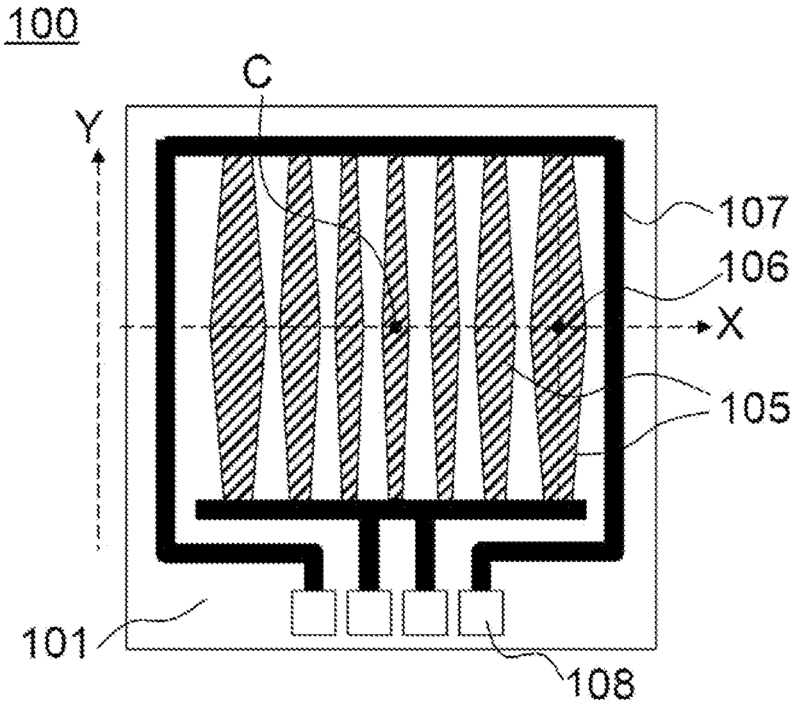
FIG. 3 illustrates a top view of a microfluidic substrate according to another embodiment of the present disclosure.
Figure 4:
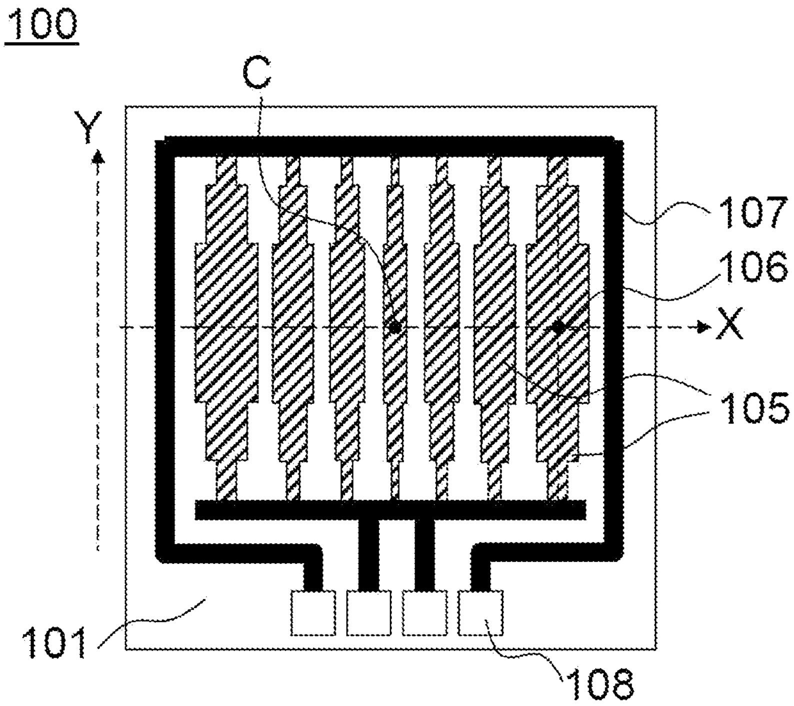
FIG. 4 illustrates a top view of a microfluidic substrate according to a further embodiment of the present disclosure.

Optionally, in some embodiments, as shown in FIGS. 1, 3 and 4, each conductive pattern 105 has a minimum width along the first direction X at the first end and the second end of the conductive pattern.

As shown in FIGS. 1, 3 and 4, each conductive pattern 105 has a minimum width along the first direction X at the first end and the second end of the conductive pattern.

Optionally, in some embodiments, as shown in FIGS. 1 and 3, each conductive pattern 105 has a width that changes continuously along the second direction Y. As shown in FIG. 3, each conductive pattern 105 has linear sides. As shown in FIG. 1, each conductive pattern 105 has curvilinear sides.

Optionally, in some embodiments, as shown in FIG. 4, each conductive pattern 105 has a width that changes discontinuously along the second direction Y.

Optionally, in some embodiments, as shown in FIGS. 1, 3 and 4, each conductive pattern 105 has an axisymmetric shape, and the symmetry axis of the axisymmetric shape is parallel to the second direction Y. Similarly, each conductive pattern 105 may also have a centrally symmetrical shape.

Figure 2C:
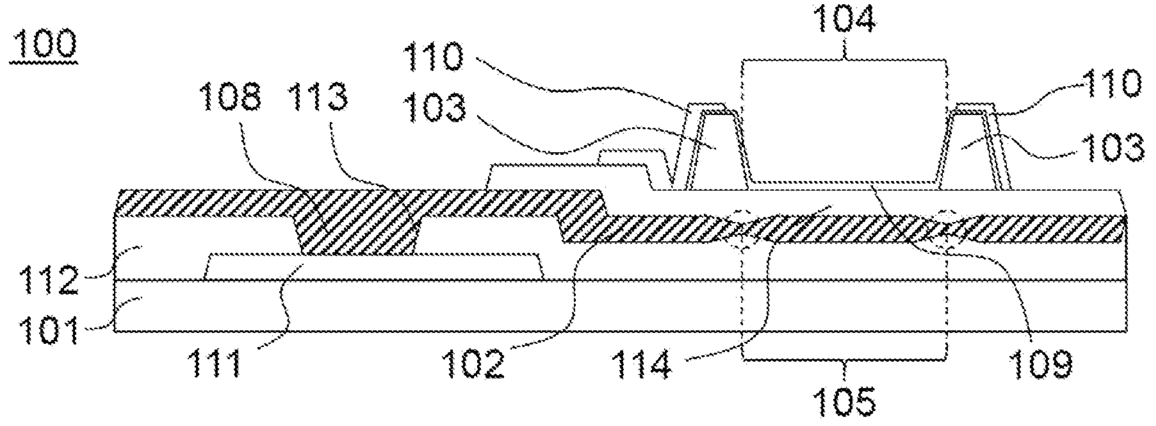
FIG. 2C illustrates a cross-sectional view of the microfluidic substrate shown in FIG. 1 taken along line B-B' according to another embodiment of the present disclosure.

Optionally, in some embodiments, as shown in FIG. 2C, each conductive pattern 105 has a minimum thickness (denoted by the dashed circle in FIG. 2C) at the first end and the second end of the conductive pattern 105.

For example, each conductive pattern 105 may have a shape as shown in FIG. 1, FIG. 3 or FIG. 4 on the X-Y plane, and each conductive pattern 105 has a minimum thickness at the first end and the second end of the conductive pattern 105. Alternatively, each conductive pattern 105 may have a rectangular shape (i.e., having a constant width) on the X-Y plane, and each conductive pattern 105 has a minimum thickness at the first end and the second end of the conductive pattern 105. As a result, it can be ensured that each conductive pattern 105 has the maximum local resistance value at the first end and the second end of the conductive pattern 105.

Optionally, in some embodiments, the overall resistance value between the first end and the second end of each conductive pattern 105 decreases as a distance between the conductive pattern 105 and a center C of the concave portion increases.

In the context of the present disclosure, the "overall resistance value" refers to a resistance value between the first end and the second end of each conductive pattern, i.e., a resistance value across the first end and the second end. A desired overall resistance value can be obtained by designing the shape of each conductive pattern. The overall resistance value of the conductive pattern can also be determined by performing measurement at two ends of the conductive pattern in the longitudinal direction.

In some embodiments, the overall resistance value between the first end and the second end of each conductive pattern decreases as the distance between the conductive pattern and the center of the concave portion increases. That is, the conductive pattern at the edge of the concave portion has a smaller overall resistance value than the conductive pattern at the center of the concave portion. Therefore, according to the resistance heating formula $P=U^2/R$, the heating power of the conductive pattern 105 away from the center C will be greater than the heating power of the conductive pattern 105 close to the center C. According to the microfluidic substrate provided by the embodiment of the present disclosure, by further designing the resistance of the conductive layer, the uniformity of heating is improved, and the low-temperature edge area of the conductive layer is reduced. As a result, the actual size of the microfluidic chip can be effectively reduced, and the number of reaction chambers per unit area can be increased.

Optionally, in some embodiments, as shown in FIGS. 1 and 2B, the conductive layer 102 has a uniform thickness, and the width of each conductive pattern 105 in the first direction X increases as the distance between the conductive pattern 105 and the center C of the concave portion 104 increases.

As shown in FIGS. 1 and 2B, the plurality of conductive patterns 105 may have the same thickness, and a conductive pattern 105 away from the center C has a larger width. Thus, a conductive pattern having a desired resistance value can be obtained in a simple design manner.

In the context of the present disclosure, unless otherwise specified, "the width of the conductive pattern in a certain direction" refers to the maximum width of the conductive pattern in that direction.

Optionally, in some embodiments, as shown in FIGS. 1, 3 and 4, the plurality of conductive patterns 105 have the same length in the second direction Y.

With the above arrangement, the projection of the plurality of conductive patterns on the first substrate corresponds to a rectangular reaction chamber. Thus, uniform heating can be provided over the area of the rectangular reaction chamber.

Optionally, in some embodiments, as shown in FIGS. 1, 3 and 4, the plurality of conductive patterns 105 constitute a parallel circuit, and the current path of each conductive pattern 105 is along the second direction Y.

In some embodiments, as shown in FIGS. 1-4, a wiring pattern 107 and a conductor plug 108 may be used, so that the plurality of conductive patterns 105 form a parallel circuit. The conductor plug 108 may be connected to an external circuit (not shown) to provide power to the parallel circuit. Thus, the present disclosure provides uniform heating over the area of the reaction chamber by using a simple parallel circuit structure. The same material can be used to fabricate the wiring pattern 107 and the plurality of conductive patterns 105. For example, the film lay of the conductive layer 102 may be patterned into the wiring pattern 107 and the plurality of conductive patterns 105 in the same patterning process.

Optionally, in some embodiments, the first substrate 101 is a glass substrate.

According to the embodiments of the present disclosure, a microfluidic substrate and a microfluidic chip may be manufactured using a glass substrate. Compared with using a silicon substrate, the manufacturing process is simplified and the process difficulty is decreased.

Optionally, in some embodiments, a material of the conductive layer 102 includes at least one of indium tin oxide and indium zinc oxide.

Indium tin oxide and indium zinc oxide are optically transparent. Therefore, fabricating the conductive layer using indium tin oxide and/or indium zinc oxide avoids optical interference to detection.

Optionally, in some embodiments, as shown in FIG. 2A, a surface of the concave portion 104 is hydrophilic.

Hydrophilization treatment may be performed on the surface of the concave portion 104, or a hydrophilic layer 109 may be vapor-deposited on the surface of the concave portion 104, so as to confine liquid in the concave portion 104. A material of the hydrophilic layer 109 may be silicon dioxide, and the embodiment of the present disclosure is not limited thereto. In addition, a hydrophobic layer 110 may be further arranged on a surface of the defining layer 103 located outside the concave portion. A material of the hydrophobic layer 110 may be resin or silicon nitride, and the embodiment of the present disclosure is not limited thereto.

Optionally, in some embodiments, as shown in FIG. 2A, the microfluidic substrate 100 further comprises: a wiring 111 between the conductive layer 102 and the first substrate 101, and a passivation layer 112 between the wiring 111 and the conductive layer 102. The passivation layer 112 includes a through hole 113, and the conductive layer 102 is electrically connected to the wiring 111 via the through hole 113.

Those skilled in the art can understand that the conductive layer 102 may be electrically connected to the wiring 111 via a conductor plug 108 (shown in FIG. 1) disposed in the through hole 112. With the above arrangement, the conductive layer can be connected to an external circuit. In addition, an insulating layer 114 may be further arranged between the conductive layer 102 and the defining layer 103 to prevent the conductive layer 102 from being short-circuited.

Optionally, in some embodiments, the wiring 111 includes a Mo—AlNd—Mo alloy layer.

According to an embodiment of the present disclosure, the wiring 111 is made of, for example, a Mo—AlNd—Mo alloy layer, which decreases the resistance of the wiring 111, thereby reducing heat generated on the wiring 111.

Figure 5:
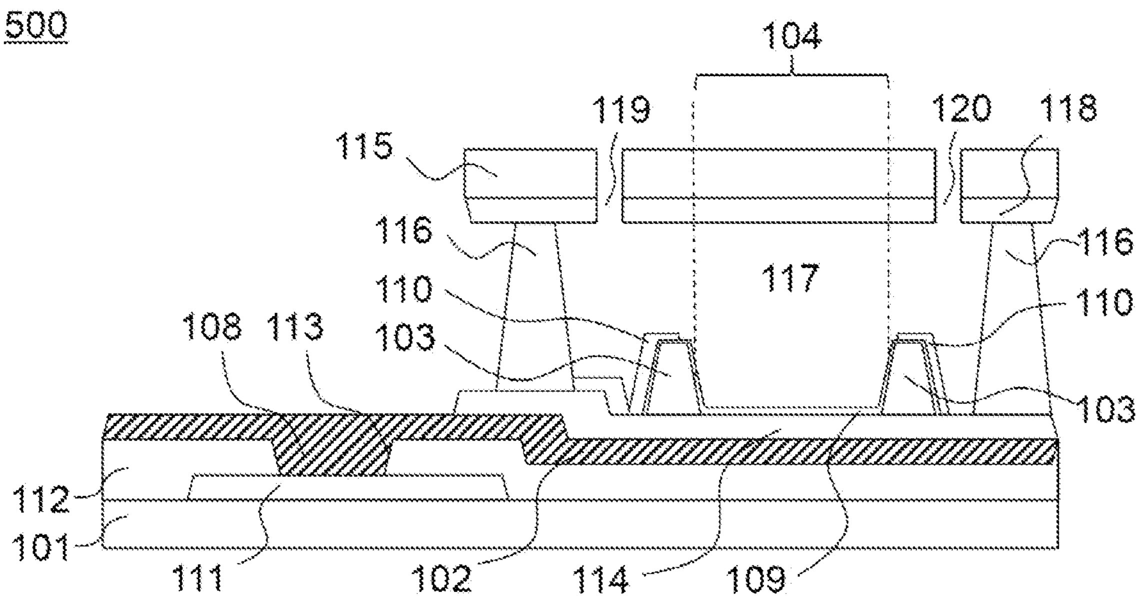
FIG. 5 illustrates a cross-sectional view of a microfluidic chip according to an embodiment of the present disclosure.

According to another aspect of the present disclosure, a microfluidic chip is provided. The microfluidic chip comprises the microfluidic substrate described in the above embodiment, so the structure of the microfluidic chip may also refer to the embodiment of the microfluidic substrate and the drawings. As shown in FIGS. 1 and 5, a microfluidic chip 500 comprises: a first substrate 101; a conductive layer 102 on the first substrate 101; and a defining layer 103 on a side of the conductive layer 102 facing away from the first substrate 101, the defining layer 103 defining a concave portion 104; wherein the conductive layer 102 includes a plurality of conductive patterns 105 corresponding to the concave portion 104, the plurality of conductive patterns 105 are arranged along a first direction X, each conductive pattern 105 extends along a second direction Y and includes a first end 1051 and a second end 1052, the first direction X is perpendicular to the second direction Y, and each conductive pattern 105 has the maximum local resistance value at the first end and the second end of the conductive pattern 105; a counter substrate 115 on a side of the defining layer 103 facing away from the first substrate 101; and a sealant 116 on the periphery of the concave portion 104, the sealant 116 defining a chamber 117.

In the embodiment of the present disclosure, for a single conductive pattern, the first end and the second end of the conductive pattern have a local resistance value greater than that of the middle position of the conductive pattern. Therefore, according to the resistance heating formula $P=I^2R$, the heating power at the first end and the second end of the conductive pattern will also be greater than the heating power at the middle position of the conductive pattern. According to the microfluidic substrate provided by the embodiment of the present disclosure, by designing the resistance of the conductive layer, the uniformity of heating is improved and the low-temperature edge area of the conductive layer is reduced. As a result, the actual size of the microfluidic chip can be effectively reduced, and the number of reaction chambers per unit area can be increased.

Optionally, in some embodiments, as shown in FIGS. 1, 2A, 2B, 3 and 4, the conductive layer 102 has a uniform thickness, each conductive pattern 105 has a midpoint 106 in the second direction Y, and each conductive pattern 105 has a maximum width along the first direction X at the midpoint 106.

For example, each conductive pattern 105 may have a centrally symmetrical shape, and the centrally symmetrical shape has a maximum width along the first direction X at the center of symmetry (i.e., the midpoint 106 in the second direction Y).

A distance between two adjacent conductive patterns 105 may be in a range of 1 to 200 μm. A simulation result shows that after patterning the conductive patterns in two directions, the temperature uniformity in the region of the concave portion has been significantly improved.

Optionally, in some embodiments, as shown in FIGS. 1, 3 and 4, each conductive pattern 105 has a minimum width along the first direction X at the first end and the second end of the conductive pattern.

As shown in FIGS. 1, 3 and 4, each conductive pattern 105 has a minimum width along the first direction X at the first end and the second end of the conductive pattern.

Optionally, in some embodiments, as shown in FIGS. 1 and 3, each conductive pattern 105 has a width that changes continuously along the second direction Y. As shown in FIG. 3, each conductive pattern 105 has linear sides. As shown in FIG. 1, each conductive pattern 105 has curvilinear sides.

Optionally, in some embodiments, as shown in FIG. 4, each conductive pattern 105 has a width that changes discontinuously along the second direction Y.

Optionally, in some embodiments, as shown in FIGS. 1, 3 and 4, each conductive pattern 105 has an axisymmetric shape, and the symmetry axis of the axisymmetric shape is parallel to the second direction Y. Similarly, each conductive pattern 105 may also have a centrally symmetrical shape.

Optionally, in some embodiments, as shown in FIG. 2C, each conductive pattern 105 has a minimum thickness (denoted by the dashed circle in FIG. 2C) at the first end and the second end of the conductive pattern 105.

For example, each conductive pattern 105 may have a shape as shown in FIG. 1, FIG. 3 or FIG. 4 on the X-Y plane, and each conductive pattern 105 has a minimum thickness at the first end and the second end of the conductive pattern 105. Alternatively, each conductive pattern 105 may have a rectangular shape (i.e., having a constant width) on the X-Y plane, and each conductive pattern 105 has a minimum thickness at the first end and the second end of the conductive pattern 105. As a result, it can be ensured that each conductive pattern 105 has the maximum local resistance value at the first end and the second end of the conductive pattern 105.

Optionally, in some embodiments, the overall resistance value between the first end and the second end of each conductive pattern 105 decreases as the distance between the conductive pattern 105 and the center C of the concave portion increases.

In some embodiments, the overall resistance value between the first end and the second end of each conductive pattern decreases as the distance between the conductive pattern and the center of the concave portion increases. That is, the conductive pattern at the edge of the concave portion has a smaller overall resistance value than the conductive pattern at the center of the concave portion. Therefore, according to the resistance heating formula $P=U^2/R$, the heating power of the conductive pattern 105 away from the center C will be greater than the heating power of the conductive pattern 105 close to the center C. According to the microfluidic substrate provided by the embodiment of the present disclosure, by further designing the resistance of the conductive layer, the uniformity of heating is improved, and the low-temperature edge area of the conductive layer is reduced. As a result, the actual size of the microfluidic chip can be effectively reduced, and the number of reaction chambers per unit area can be increased.

Optionally, in some embodiments, as shown in FIGS. 1 and 2B, the conductive layer 102 has a uniform thickness, and the width of each conductive pattern 105 in the first direction X increases as the distance between the conductive pattern 105 and the center C of the concave portion 104 increases.

As shown in FIGS. 1 and 2B, the plurality of conductive patterns 105 may have the same thickness, and a conductive pattern 105 away from the center C has a larger width. Thus, a conductive pattern having a desired resistance value can be obtained in a simple design manner.

Optionally, in some embodiments, as shown in FIGS. 1, 3 and 4, the plurality of conductive patterns 105 have the same length in the second direction Y.

With the above arrangement, the projection of the plurality of conductive patterns on the first substrate corresponds to a rectangular reaction chamber. Thus, uniform heating can be provided over the area of the rectangular reaction chamber.

Optionally, in some embodiments, as shown in FIGS. 1, 3 and 4, the plurality of conductive patterns 105 constitute a parallel circuit, and the current path of each conductive pattern 105 is along the second direction Y.

In some embodiments, as shown in FIGS. 1-4, a wiring pattern 107 and a conductor plug 108 may be used, so that the plurality of conductive patterns 105 form a parallel circuit. The conductor plug 108 may be connected to an external circuit (not shown) to provide power to the parallel circuit. Thus, the present disclosure provides uniform heating over the area of the reaction chamber by using a simple parallel circuit structure. The same material can be used to fabricate the wiring pattern 107 and the plurality of conductive patterns 105. For example, the film layer of the conductive layer 102 may be patterned into the wiring pattern 107 and the plurality of conductive patterns 105 in the same patterning process.

Optionally, in some embodiments, the first substrate 101 is a glass substrate.

According to the embodiments of the present disclosure, a microfluidic substrate and a microfluidic chip may be manufactured using a glass substrate. Compared with using a silicon substrate, the manufacturing process is simplified and the process difficulty is decreased.

Optionally, in some embodiments, a material of the conductive layer 102 includes at least one of indium tin oxide and indium zinc oxide.

Indium tin oxide and indium zinc oxide are optically transparent. Therefore, fabricating the conductive layer using indium tin oxide and/or indium zinc oxide avoids optical interference to detection.

Optionally, in some embodiments, as shown in FIG. 2A, a surface of the concave portion 104 is hydrophilic.

Hydrophilization treatment may be performed on the surface of the concave portion 104, or a hydrophilic layer 109 may be vapor-deposited on the surface of the concave portion 104, so as to confine liquid in the concave portion 104. A material of the hydrophilic layer 109 may be silicon dioxide, and the embodiment of the present disclosure is not limited thereto. In addition, a hydrophobic layer 110 may be further arranged on a surface of the defining layer 103 located outside the concave portion. A material of the hydrophobic layer 110 may be resin or silicon nitride, and the embodiment of the present disclosure is not limited thereto.

Optionally, in some embodiments, as shown in FIG. 2A, the microfluidic substrate 100 further comprises: a wiring 111 between the conductive layer 102 and the first substrate 101, and a passivation layer 112 between the wiring 111 and the conductive layer 102. The passivation layer 112 includes a through hole 113, and the conductive layer 102 is electrically connected to the wiring 111 via the through hole 113.

Those skilled in the art can understand that the conductive layer 102 may be electrically connected to the wiring 111 via a conductor plug 108 (shown in FIG. 1) disposed in the through hole 112. With the above arrangement, the conductive layer can be connected to an external circuit. In addition, an insulating layer 114 may be further arranged between the conductive layer 102 and the defining layer 103 to prevent the conductive layer 102 from being short-circuited.

Optionally, in some embodiments, the wiring 111 includes a Mo—AlNd—Mo alloy layer.

According to an embodiment of the present disclosure, the wiring 111 is made of, for example, a Mo—AlNd—Mo alloy layer, which decreases the resistance of the wiring 111, thereby reducing heat generated on the wiring 111.

Optionally, in some embodiments, as shown in FIG. 5, the chamber 117 is a reaction chamber, and the counter substrate 115 includes a sample inlet 119 and a sample outlet 120.

The microfluidic chip provided by the embodiment of the present disclosure can be used for dPCR. A patterned temperature control module is integrated on a chip to achieve efficient, accurate and uniform temperature control, which effectively reduces the size of the chip, increases the number of reaction chamber arrays, and avoids the inaccuracy in detection results.

Figure 6:
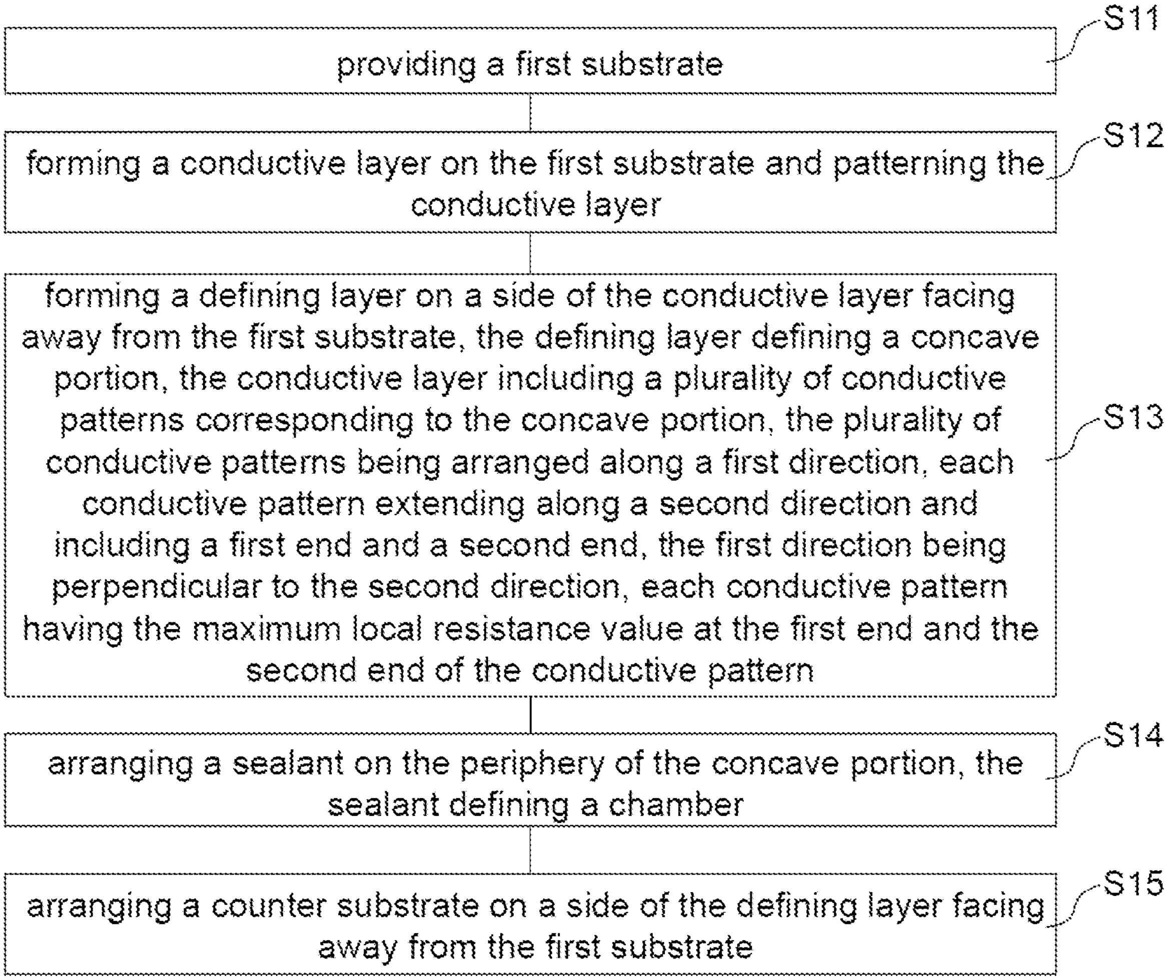
FIG. 6 illustrates a flow chart of a manufacturing method of a microfluidic chip according to an embodiment of the present disclosure.

According to a further aspect of the present disclosure, a method for manufacturing a microfluidic chip is provided. As shown in FIG. 6, the method comprises: S11, providing a first substrate; S12, forming a conductive layer on the first substrate and patterning the conductive layer; S13, forming a defining layer on a side of the conductive layer facing away from the first substrate, the defining layer defining a concave portion, wherein the conductive layer includes a plurality of conductive patterns corresponding to the concave portion, the plurality of conductive patterns are arranged along a first direction, each conductive pattern extends along a second direction and includes a first end and a second end, the first direction is perpendicular to the second direction, and each conductive pattern has the maximum local resistance value at the first end and the second end of the conductive pattern; S14, arranging a sealant on the periphery of the concave portion, the sealant defining a chamber; and S15, arranging a counter substrate on a side of the defining layer facing away from the first substrate.

According to the manufacturing method of a microfluidic substrate provided by the embodiment of the present disclosure, by designing the resistance of the conductive layer, the uniformity of heating is improved, and the low-temperature edge area of the conductive layer is reduced. As a result, the actual size of the microfluidic chip can be effectively reduced, and the number of reaction chambers per unit area can be increased.

An example is provided below to introduce the manufacturing method of a microfluidic chip provided by the present disclosure. The microfluidic chip 500 may comprise the microfluidic substrate described in any of the foregoing embodiments. Hereinafter, the steps of the method will be briefly described by taking the microfluidic chip 500 comprising the microfluidic substrate 100 as an example.

Step 701: providing a first substrate 101. The first substrate 101 may be made of any suitable material. In an example, the first substrate 101 is made of glass.

Step 702: forming a conductive film layer on the first substrate 101 at about 240° C. In an example, a molybdenum (Mo) layer with a thickness of 200 Å, an aluminum neodymium (AlNd) layer with a thickness of 3000 Å, and a molybdenum (Mo) layer with a thickness of 800 Å are deposited successively on the first substrate 101 to form a conductive film layer. The conductive film layer is patterned, such as exposure, development, etching, etc., to form a wiring 111.

Step 703: depositing a first insulating film layer 112 on the wiring 111 at about 200° C., and patterning the first insulating film 112 to form a first insulating layer 112 covering the wiring 111. In an example, the first insulating layer 112 is a $SiO_2$ layer with a thickness of about 3000 Å.

Step 704: patterning the first insulating layer 112 to form at least one through hole 113 penetrating the first insulating layer 112, the at least one through hole 113 exposing a portion of the wiring 111. In an example, the first insulating layer 112 is etched in a dry etching machine to form the through hole 113. The specific process is described as follows: performing etching for 10 seconds under the conditions of a pressure being about 150 mtorr, a power being about 800 w, and a volume flow of $O_2$ being about 400 sccm (standard cubic centimeter per minute); performing etching for 200 seconds under the conditions of a pressure being about 60 mtorr, a power being about 800 w, and a volume flow ratio of $CF_4$ to $O_2$ being about 200:50; performing etching for 30 seconds under the conditions of a pressure being about 130 mtorr, a power being about 800 w, and a volume flow ratio of $CF_4$ to $O_2$ being about 400:40; and performing etching for 160 seconds under the conditions of a pressure being about 60 mtorr, a power being about 800 w, and a volume flow ratio of $CF_4$ to $O_2$ being about 200:50.

Step 705: depositing a conductive film layer (conductive layer) on a side of the first insulating layer 112 away from the first substrate 101, and then performing processes such as exposure, development, etching, peeling, and the like on the conductive film layer to form a plurality of conductive patterns 105 (i.e., heaters). In an example, the material of the conductive pattern 105 is ITO.

Step 706: depositing a second insulating film layer on a side of the conductive pattern 105 away from the first substrate 101, and patterning the second insulating film layer to form a second insulating layer 114 that at least partially covers the conductive pattern 105. In an example, the material of the second insulating layer 114 is $SiO_2$. In another example, the second insulating layer 114 includes an $SiO_2$ layer with a thickness of about 1000 Å and a SiNx layer with a thickness of about 2000 Å that are sequentially stacked.

Step 707: coating a defining film layer on a side of the second insulating layer 114 away from the first substrate 101, and patterning the defining film layer to form a defining layer 103 that defines a concave portion 104. In an example, the process of forming the defining layer 103 is described as follows: firstly, spin-coating an optical adhesive on a surface of the second insulating layer 114 away from the first substrate 101 at a speed of 300 revolutions per minute under a pressure of 30 Kpa, the spin coating taking about 10 seconds, and then curing the optical adhesive for 120 seconds at a temperature of 90° C. The above process is repeated twice to obtain a defining film layer. Next, the defining film layer is exposed through a mask, and then the exposed defining film layer is developed with a developing solution for 100 seconds, and then etched. At a temperature of 230° C., the etched defining film layer is cured for 30 minutes, and finally the defining layer 103 defining the concave portion 104 is obtained. The material of the defining layer 103 includes a photoresist. In an example, the concave portion 104 of the defining layer 103 is a cylindrical concave, and the bottom of the concave portion 104 has a diameter of 50 μm and a depth between 40 and 50 μm. The defining layer 103 may define a plurality of concave portions 104, and the distance between the centers of two adjacent concave portions 104 is 100 micrometers.

Step 708: depositing an insulating film layer on a surface of the defining layer 103 away from the first substrate 101 at 200° C., and performing exposure, development and etching on the insulating film layer to form a patterned layer. The patterned layer is treated with a 0.4% KOH solution for about 15 minutes to perform hydrophilic modification on the patterned layer, thereby forming a hydrophilic layer 109. The hydrophilic layer 109 covers the surface of the defining layer 103 away from the first substrate 101 and covers the bottom and sidewalls of the concave portion 104. In an example, the hydrophilic layer 109 is a $SiO_2$ layer with a thickness of about 3000 Å.

Step 709: depositing an insulating film layer on a surface of the hydrophilic layer 109 away from the first substrate 101, and performing exposure, development and etching on the insulating film layer to form a first hydrophobic layer 110. In an example, the process of forming the first hydrophobic layer 110 is as follows: in a plasma enhanced chemical vapor deposition (PECVD) apparatus, introducing $SiH_4$ (whose volume flow is 110 sccm), $NH_3$ (whose volume flow is 700 sccm), and $N_2$ (whose volume flow is 2260 sccm, the introduction time being 100 seconds) into the reaction chamber under a temperature of about 200° C., a power of about 600 W, a pressure of about 1200 mtorr, and the distance between the plasma reaction enhancement target and the sample to be deposited in the PECVD apparatus being about 1000 mils, so as to deposit a $SiN_x$ film layer with a thickness of 1000 Å on the surface of the hydrophilic layer 108 away from the first substrate 101, and performing exposure, development and etching on the $SiN_x$ film layer to form the first hydrophobic layer 110.

Step 710: encapsulating the microfluidic substrate 100 on which hydrophilic treatment and hydrophobic treatment have been performed.

Step 711: providing a counter substrate 115. The counter substrate 115 may be made of any suitable material. In an example, the counter substrate 115 is made of glass.

Step 712: depositing a film layer on a side of the counter substrate 115 close to the first substrate 101, and processing the film layer to form a second hydrophobic layer 118. The second hydrophobic layer 118 is a $TiO_2$ layer with a thickness of about 1000 Å. In an example, the second hydrophobic layer 118 is formed of $SiN_x$.

Step 713: punching holes on the counter substrate 115 and the second hydrophobic layer 118 to form at least one sample inlet 119 and at least one sample outlet 120 penetrating the counter substrate 115 and the second hydrophobic layer 118. In an example, the at least one sample inlet 119 and the at least one sample outlet 120 each has a diameter ranging from 0.6 mm to 1.2 mm.

Step 714: curing and encapsulating the microfluidic substrate 100 and the counter substrate 115 with a sealant, and defining a spacing between the microfluidic substrate 100 and the counter substrate 115.

It is to be noted that the manufacturing method may further comprise more steps, which can be determined according to actual requirements, and is not limited in the embodiments of the present disclosure. For the technical effects achieved by the manufacturing method, reference may be made to the above description of the microfluidic substrate 100 and the microfluidic chip 500, which will not be repeated here.

In the description of the present disclosure, the orientations or positional relationships indicated by the terms such as "upper" and "lower" are based on orientations or positional relationships shown in the drawings, which are only for facilitating description of the present disclosure, rather than requiring that the present disclosure must be constructed and operated in a particular orientation, thus they cannot be construed as limitations to the present disclosure.

In the description of this specification, the description with reference to the terms "an embodiment", "another embodiment", etc. means that a specific feature, structure, material or characteristic described in conjunction with said embodiment is included in at least one embodiment of the present disclosure. In this specification, the schematic representations of the above-mentioned terms do not necessarily refer to the same embodiment or example. Moreover, the described specific feature, structure, material or characteristic may be combined in any one or more embodiments or examples in a suitable manner. In addition, those skilled in the art can combine different embodiments or examples and the features of the different embodiments or examples described in this specification in the case of causing no conflict. In addition, it is to be noted that in this specification, the terms "first" and "second" are only used for descriptive purposes, and cannot be understood as indicating or implying relative importance or implicitly indicating the number of indicated technical features.

What have been stated above are only specific embodiments of the present disclosure, but the protection scope of the present disclosure is not limited thereto. Any variations or substitutions that can be easily conceived by those skilled in the art familiar with this technical field within the technical scope revealed by the present disclosure should be encompassed within the protection scope of the present disclosure. Thus, the protection scope of the present disclosure should be based on the protection scope of the claims.

What is claimed is:

1. A microfluidic substrate, comprising:

a first substrate;

a conductive layer on the first substrate;

a defining layer on a side of the conductive layer facing away from the first substrate, the defining layer defining a concave portion;

a wiring between the conductive layer and the first substrate; and a passivation layer between the wiring and the conductive layer, wherein the conductive layer comprises a plurality of conductive patterns corresponding to the concave portion, the plurality of conductive patterns are arranged along a first direction, each conductive pattern extends along a second direction and comprises a first end and a second end, the first direction is perpendicular to the second direction, and each conductive pattern has a maximum local resistance value at the first end and the second end of the conductive pattern, the passivation layer comprises a through hole; the conductive layer is electrically connected to the wiring via the through hole.

2. The microfluidic substrate according to claim 1, wherein the conductive layer has a uniform thickness, each conductive pattern has a midpoint in the second direction, and each conductive pattern has a maximum width along the first direction at the midpoint.

3. The microfluidic substrate according to claim 2, wherein each conductive pattern has a minimum width along the first direction at the first end and the second end of the conductive pattern.

4. The microfluidic substrate according to claim 2, wherein each conductive pattern has a width that changes continuously along the second direction.

5. The microfluidic substrate according to claim 4, wherein each conductive pattern has linear sides.

6. The microfluidic substrate according to claim 4, wherein each conductive pattern has curvilinear sides.

7. The microfluidic substrate according to claim 2, wherein each conductive pattern has a width that changes discontinuously along the second direction.

8. The microfluidic substrate according to claim 1, wherein each conductive pattern has an axisymmetric shape, and a symmetry axis of the axisymmetric shape is parallel to the second direction.

9. The microfluidic substrate according to claim 1, wherein each conductive pattern has a minimum thickness at the first end and the second end of the conductive pattern.

10. The microfluidic substrate according to claim 1, wherein an overall resistance value between the first end and the second end of each conductive pattern decreases as a distance between the conductive pattern and a center of the concave portion increases.

11. The microfluidic substrate according to claim 1, wherein the conductive layer has a uniform thickness, and a width of each conductive pattern in the first direction increases as a distance between the conductive pattern and a center of the concave portion increases.

12. The microfluidic substrate according to claim 1, wherein the plurality of conductive patterns has a same length in the second direction.

13. The microfluidic substrate according to claim 1, wherein the plurality of conductive patterns constitute a parallel circuit, and a current path of each conductive pattern is along the second direction.

14. The microfluidic substrate according to claim 1, wherein the first substrate is a glass substrate.

15. The microfluidic substrate according to claim 1, wherein a material of the conductive layer comprises at least one of indium tin oxide and indium zinc oxide.

16. The microfluidic substrate according to claim 1, wherein the wiring comprises a Mo—AlNd—Mo alloy layer.

17. A microfluidic chip, comprising:

the microfluidic substrate according to claim 1;

a counter substrate on a side of the defining layer facing away from the first substrate; and a sealant on the periphery of the concave portion, the sealant defining a chamber.

18. The microfluidic chip according to claim 17, wherein the chamber is a reaction chamber, and the counter substrate comprises a sample inlet and a sample outlet.

19. A method for manufacturing a microfluidic chip, comprising:

providing a first substrate;

forming a wiring on the first substrate;

forming a passivation layer comprising a through hole on the wiring;

forming a conductive layer on the passivation layer and patterning the conductive layer;

forming a defining layer on a side of the conductive layer facing away from the first substrate, the defining layer defining a concave portion, the conductive layer comprising a plurality of conductive patterns corresponding to the concave portion, the plurality of conductive patterns being arranged along a first direction, each conductive pattern extending along a second direction and comprising a first end and a second end, the first direction being perpendicular to the second direction, each conductive pattern having a maximum local resistance value at the first end and the second end of the conductive pattern, and the conductive layer being electrically connected to the wiring via the through hole;

arranging a sealant on the periphery of the concave portion, the sealant defining a chamber; and arranging a counter substrate on a side of the defining layer facing away from the first substrate.

* * * * *